United States Patent Office 3,551,972
Patented Jan. 5, 1971

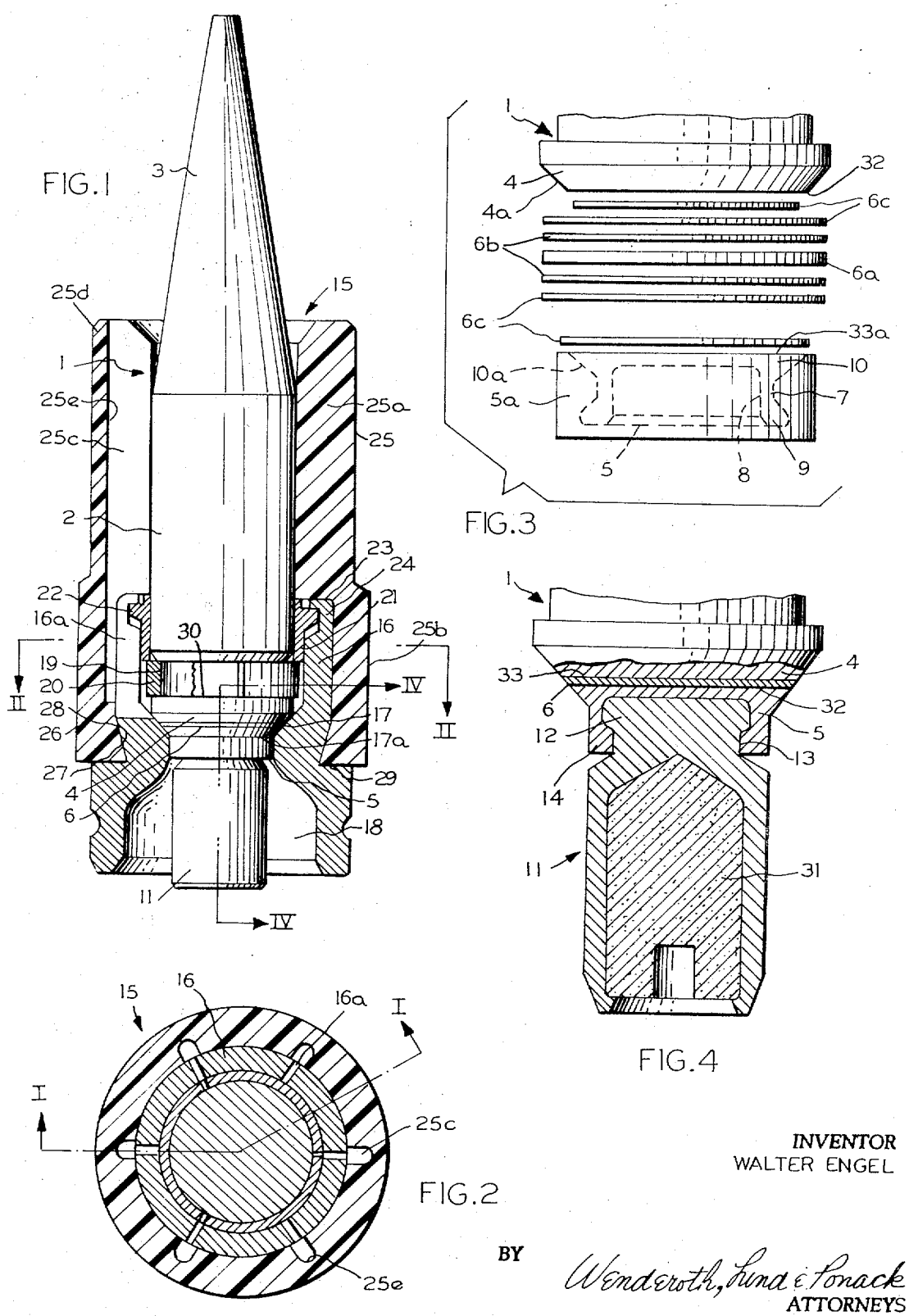

3,551,972
METHOD OF MANUFACTURING A SABOT
Walter Engel, Dubendorf, Switzerland, assignor to Oerlikon-Buhrle Holding Ltd., Zurich, Switzerland
Original application July 24, 1967, Ser. No. 655,583, now Patent No. 3,455,768. Divided and this application Oct. 11, 1968, Ser. No. 766,712
Int. Cl. B21k *21/06;* F42b *13/16*
U.S. Cl. 29—1.23                                    1 Claim

ABSTRACT OF THE DISCLOSURE

A method for construction of a sabot projectile, which carries with it a tracer composition on the rear part of the hard-metal projectile body, connected to a steel joining part by a flanged joint, has a hard solder bonding connection for connecting the joining part to the rear part. In the zone of the hard solder bonding connection, the rear part and the joining part are constructed as two truncated circular cones merging into one another. In order to relieve the load on the hard solder bonding connection, these two truncated cones are supported at the rear in common against a corresponding inside surface of a hollow truncated cone on the sabot.

---

This application is a division of my application Ser. No. 655,583, filed July 24, 1967 now Pat. No. 3,455,768 entitled "Sabot Projectile."

This invention relates to a method of constructing projectiles particularly sabot projectiles for penetrating armor, provided with a projectile rear part of hard-metal and with a tracer composition.

In the case of a known sabot projectile of this kind as shown in Pat. No. 2,669,930, granted Feb. 23, 1954 to Darby et al., a hard-metal projectile core is completely enclosed in a two-piece casing forming the outside shape of the projectile, the rear part of which consists of steel, or some other easily machinable material. The problem of carrying a tracer composition arranged on the rear part is solved in a way so that a joining part is attached in one piece with the rear part of the case, which has a recess open to the rear for reception of the tracer composition. It is an object of the present invention to simplify and remove the disadvantages of such a construction.

A further object of the invention is to solve the problem of mounting a tracer composition on the projectile with as much saving in weight and, as regards production, as cheaply as possible.

A further object of the invention is to secure a steel joining part to the hard-metal rear part by a hard solder bonding connection and to secure a casing for the tracer composition to such joining part by the engagement of a joining flange of the joining part in an annular groove in the casing.

A further object is to keep the additional weight on the projectile to what is absolutely essential and also to keep the expenditure of material and machining to a minimum.

A still further object is to provide a method where the tracer composition can be manufactured independently before being mounted in the joining part.

An additional object is to ensure a perfect centering of the joining part in relation to the rear part in which a blank is first of all secured to the rear part.

A still further object of the invention is to relieve the hard solder bonding connection of the inertia force on discharge of the components lying behind it.

Another object of the invention relates to the more certain imparting of spin on discharge from the sabot to the subcaliber projectile body. The supporting of the rear part and joining part on the sabot, due to the truncated cones, serves the two last-mentioned objects.

With regard to the reliability of the hard solder bonding connection, a further object is to avoid the shear stresses arising on cooling, as a result of the different coefficients of expansion of hard-metal and steel, by interposing a material able to take up the difference, and a suitable method of cooling.

With the above and other objects in view which will become apparent from the detailed description below, one preferred form of the invention is shown in the drawings in which:

FIG. 1 shows a sabot projectile, partially in elevation, partially in longitudinal section taken along the section line I—I in FIG. 2;

FIG. 2 is a cross-section through the sabot projectile on the line II—II in FIG. 1;

FIG. 3 illustrates diagrammatically the arrangement of the successive layers of the components for the hard solder bonding connection; and FIG. 4 is a longitudinal section, on a greatly enlarged scale, of the rear part of the subcaliber projectile body along the section line IV—IV in FIG. 1, together with a tracer composition in fully fabricated condition.

The body 2, consisting of tungsten carbide and cobalt, of the subcaliber projectile body 1 has essentially a cylindrical shape, with a leading nose 3, formed by a ballistic cap and a short rear part 4, which is constructed as a first truncated circular cone and has a generated surface 4a. To this rear part 4, a joining part 5 consisting of chromenickel heat-treatable steel, or a blank 5a, out of which the joining part 5 will be machined, is securely bonded by a hard solder bonding connection 6.

The hard solder bonding or brazing connection able to meet the heavy stresses occurring can be obtained as follows. As an intermediate layer of the bond 6, a small plate 6a is used, the outside diameter of which is somewhat greater than the diameter of the rear end face 32 of the subcaliber projectile body 1, which is at least 0.2 mm. thick and consists of pure copper containing no oxygen. The small plate 6a is coated on both sides with a layer 0.1 mm. thick of hot rolled-on silver solder 6b. The silver solder has the following compositions: 49% Ag, 16% Cu, 23% Zn, 5% Ni and 7% Mn. The rear end face 32 of the subcaliber projectile body 1, the front face 33a of the blank 5a, as well as the coated small plate 6a, 6b, are painted with a flux 6c and these parts, namely the blank 5a, the hard solder small plate 6a, 6b, 6c as well as the subcaliber projectile body 1, are laid in layers on top of one another (see FIG. 3) and subjected to an axial pressure of 3 kg. per cm.² After a uniform heating to 680 to 700° C. and a melting of the silver solder, there follows a cooling, first of all to about 500° C. with the pressure loading still applied and finally, without load, to room temperature.

In FIG. 3, inside the blank 5a, the joining part 5 is shown dotted in its initial condition, in which condition its essentially cylindrical appendix 7 has a smooth bore 8 and furthermore a joning flange 9 projecting outwards. A conical generated surface 10a of a second truncated cone 10, connecting the base surface 33 of the joining part 5 with the appendix 7, forms an extension to the rear of the generated surface 4a of the first truncated cone on the rear part 4 of the projectile body 2.

A groove 13 is cut in the circumference of the footing 12 of a sleeve-shaped casing 11 whose footing diameter is equal to the inside diameter of the bore 8 of the joining part 5, but is smaller than that of the rear part of the casing 11 containing the tracer composition 31. Its flanks are tapered so that the groove opens outwards. As FIG. 4 shows, the casing 11 fits into the bore 8 of the joining part 5 and is centered in the latter.

The casing 11 is furthermore secured with its footing 12 resting against the bottom of the smooth bore 8 by the joining flange 14, now crimped in on the appendix 7. A beaded joint 13, 14 is produced by pressing, and thereby pushing back, the original joining flange 9 (FIG. 3). The deformed joining flange 14 thereby completely surrounds the base and the front tapered flank of the groove 13. After the deforming, the outside diameter of the appendix 7 of the joining part 5 is the same size as the outside diameter of the part of the casing 11 containing the tracer composition 31.

The rear part of the projectile body 2 fits (FIG. 1) into the centrally bored light alloy rear part 16 of the sabot 15 and is supported with the generated surface 4a of the tapered rear part 4 and the generated surface 10a of the second truncated circular cone 10 of the joining part 5 on a hollow coned surface 17a, made with an approximately equal generating angle of about 90°, of the sabot rear part 16 which may be called the supporting part. The part 18 of the coaxial bore in the rear part 16 of the sabot 15, in which the casing 11 of the tracer composition 31 is arranged, widens inwardly from the narrowest part, bounding the hollow coned surface 17a.

As FIG. 1 shows, in the annular groove 19, formed in the rear part 4 of the subcaliber projectile body 1, which has a groove flank 30, there is fixed a locking element 20, formed by three equal segments of a ring of rectangular cross-section. On the surface of this locking element 20, projecting beyond the rear part 4 of the subcaliber projectile body 1, is supported an abutment bush 21, also consisting of three equal segments fitting against the subcaliber projectile body 1 which has a sleeve flange 22 projecting outwards.

The front part 24 of the sabot rear part 16 grips around the abutment bush 21 and the locking element 20 and thereby secures the subcaliber projectile body 1 against sliding forward, since its joining flange 23, made with low wall strength, is crimped over the abutment bush flange 22. In the front part 24 of the sabot rear part 16 are cut slots 16a from the front face down, at regular angular intervals, radially directed, carried through as far as the top of the rear part 4 of the projectile body 2 (see FIG. 1), which bound the segments.

The second casing-shaped part, hereafter referred to as casing 25, of the sabot 15 is made of a thermoplastic material, e.g. nylon. It consists of a cylindrical front part 25a, which surrounds the body 2 of the subcaliber projectile body 1, and a rear part 25b enclosing the rear part 16. The truncated cone-shaped part, projecting out over the cylindrical part 25a of the casing 25, forms a rotating band 26 for the whole sabot projectile. The rearmost part of the bore of the casing, in the region of the rotating band 26, is formed by a tapered surface 27, opening to the front, which rests against a correspondingly shaped retaining surface 28 of the rear part 16 of the sabot 15. Furthermore, from the bore of the casing 25 downwards, longitudinal grooves 25c are cut in the latter at regular angular intervals, whereby the webs 25d, lying between the base 25e of the grooves 25c and the outside surface of the casing 25, form predetermined breaking places.

The portion of the sabot rear part 16 lying in rear of the end face 29 of the casing 25, directed at right angles to the longitudinal axis of the projectile, until discharge from a gun barrel, not shown, fits in known fashion into the cartridge case mouth, also not shown here, of a cartridge, which contains a propellant charge.

The operation of the sabot projectile described, immediately before discharge and on actual discharge, is as follows:

When the cartridge, of which the sabot projectile forms a part, is suddenly checked at the end of the process of loading into the cartridge chamber of the gun barrel, as a result of its forwardly-directed inertia force, the subcaliber projectile body 1 bears, with its rear groove flank 30 as abutment surface, against the locking element 20, and the latter in turn on the sleeve 21 secured by the joining flange 23 of the sabot rear part 16.

After ignition of the propellant charge, on engagement of the rotating band 26 in the rifling of the gun barrel, not shown, the latter is radially compressed and, partly plastically and partly elastically, deformed. Owing to the friction occurring between the face 27 of the casing 25 and the retaining surface 28 of the rear part 16 of the sabot, the twist exerted by the rifling grooves on the rotating band 26, or the casing 25, is imparted to the rear part 16 of the sabot 15 and furthermore from this, through the friction acting between the hollow coned surface 17a and the generated surface 4a on the rear part 4 of the subcaliber projectile body 1, to the latter.

The outside wall of the cylindrical part 25a of the casing 25 serves to guide the whole sabot projectile during the passage down the gun barrel. Furthermore, during this movement of the projectile, the tracer composition 31 is ignited by the hot propellant gases.

After the exit of the projectile from the barrel, the casing 25, under the effect of the centrifugal force acting on it, is broken up along the webs 25d as predetermined breaking places, into segments moving outwards from the subcaliber projectile body 1. Also under the effect of the centrifugal force, the segments forming the front part 24 of the sabot rear part 16 are torn from the latter and moved away so that the segment parts of the sleeve 21 and the segments of the locking element 20, moving with these, liberate the subcaliber projectile body 1. The liberated subcaliber projectile body 1, together with the joining part 5 soldered to it and the tracer composition 31, since a smaller air resistance acts on it than on the remainder of the rear part 16 of the sabot 15, moves away forward from the latter. Thereby there is a favorable effect from the fact that the coaxial bore 18 containing the casing 11 of the tracer composition 31 widens towards the rear. The casing 11, drawn by the subcaliber projectile body 1 through the bore 18, cannot, as a result of this, touch the bore wall in the case of swinging of the subcaliber projectile body 1, if the longitudinal axis forms an angle with the direction of flight. Hence a checking of the subcaliber projectile body cannot occur.

On account of the through bore 18 of the sabot rear part 16, the propellant gases, during the passage through the gun barrel, do not only impinge on the surface of the sabot rear part 16, but also on the rear side of the subcaliber projectile body 1, formed by the surface of the casing 11 of the tracer composition 31. The relative magnitudes of the two surfaces and the inerita masses of sabot 15 and subcaliber projectile body 1 are such that the acceleration to which the whole sabot projectile is subjected during this movement is greater than that which is imparted to the subcaliber projectile body by the gas force.

As against the gas force acting on it in the opposite direction, the rearwardly directed inerita force of the subcaliber body accordingly predominates. The two components of the resultant of these two forces acting perpendicularly on the hollow coned surface 17a of the sabot rear part 16 is, however, known to be greater together than the resultant itself. The construction of the rear part 4 as a truncated cone then produces the effect that the frictional force, acting in a plane at right angles to the longitudinal axis of the projectile tangentially to the subcaliber body 1, turns out large enough to accelerate the latter to the rate of spin necessary for its stabilization in free flight.

At the same time, the resultant force on the subcaliber body also acts advantageously to produce a removal of load from the hard solder bonding connection, in that the truncated cone 10a of the joining part 10 is pressed against the generated surface 17a of the sabot rear part 16. Thereby the portion of the inertia force arising from the joining part 10 and casing 11 is kept away from the hard solder bonding connection.

I claim:
1. Process for the production of a subcaliber projectile body stretching along an axis for a sabot projectile, said projectile body having a rear end face on a rear part, consisting of tungsten carbide and cobalt, provided with a tracer appendix which has a joining part, which has a front face directed towards said rear end face and with a casing which contains a tracing composition, said process involving the following steps:

combining the front face of a blank of chrome-nickel-heat treatable steel by brazing with the rear end face of said projectile body, comprising coating a plate at least 0.2 mm. thick of copper containing no oxygen on both sides with a layer 0.1 mm. thick of hot rolled-on silver solder, painting the rear end face of said propectile body, both layer surfaces and the front face with a flux, laying said blank, said coated plate and said projectile body coaxially superposed into a stack, pressing said stack together with a pressure of 3 kg. per cm.$^2$ and heating it to 600 to 700° until said silver solder is melted, then under said pressure cooling said stack to approximately 500° C., then removing said pressure cooling down said stack to room temperature, then machining the soldered blank into the form of a joining part coaxially to the projectile axis with a recess and an outwardly directed joining flange, inserting a casing footing having an annular groove into said recess of said joining part and finally plastically deforming said joining flange towards the axis of said projectile until it engages firmly into said annular groove of said casing.

References Cited

UNITED STATES PATENTS

| | | | |
|---|---|---|---|
| 2,608,753 | 9/1952 | Mooradian | 29—472.3X |
| 3,019,733 | 2/1962 | Braid | 29—1.2X |
| 3,349,712 | 10/1967 | Schwager et al. | 102—93 |
| 3,454,374 | 7/1969 | Domin | 29—502X |

H. A. KILBY, Jr., Primary Examiner

U.S. Cl. X.R.

102—87, 93; 29—502